United States Patent [19]

Föhl

[11] 4,118,068
[45] Oct. 3, 1978

[54] SWINGING FITTING FOR SAFETY BELTS IN MOTOR VEHICLES

[75] Inventor: Artur Föhl, Schorndorf, Germany

[73] Assignee: REPA Feinstanzwerk GmbH, Alfdorf, Germany

[21] Appl. No.: 833,768

[22] Filed: Sep. 16, 1977

[51] Int. Cl.² .............................................. A62B 35/00
[52] U.S. Cl. .................................................. 297/385
[58] Field of Search ................ 297/385, 389; 298/204, 298/293, 292; 280/744

[56] References Cited

U.S. PATENT DOCUMENTS

| 1,358,194 | 11/1920 | Funk | 297/333 |
| 3,295,862 | 1/1967 | Ebert | 297/385 X |
| 3,394,911 | 7/1968 | Sorensen | 248/393 |
| 3,550,955 | 12/1970 | Nicholas et al. | 297/385 |
| 3,572,832 | 3/1971 | Graham et al. | 297/385 |
| 3,941,419 | 3/1976 | Blom | 280/744 |

FOREIGN PATENT DOCUMENTS

| 218,107 | 1/1910 | France | 82/32 CS |
| 2,225,011 | 10/1974 | France | 280/744 |

Primary Examiner—James T. McCall
Attorney, Agent, or Firm—Herbert L. Lerner

[57] ABSTRACT

A swinging fitting for safety belts having a belt holder arm rotatable about a bearing pin and a tilting spring urging the belt holder arm in rest position when the belt is not in use. An intermediate member is placed in locking engagement with the bearing pin. The intermediate member engages one end of the tilting spring and the other end of the spring is engaged by the holder arm.

7 Claims, 3 Drawing Figures

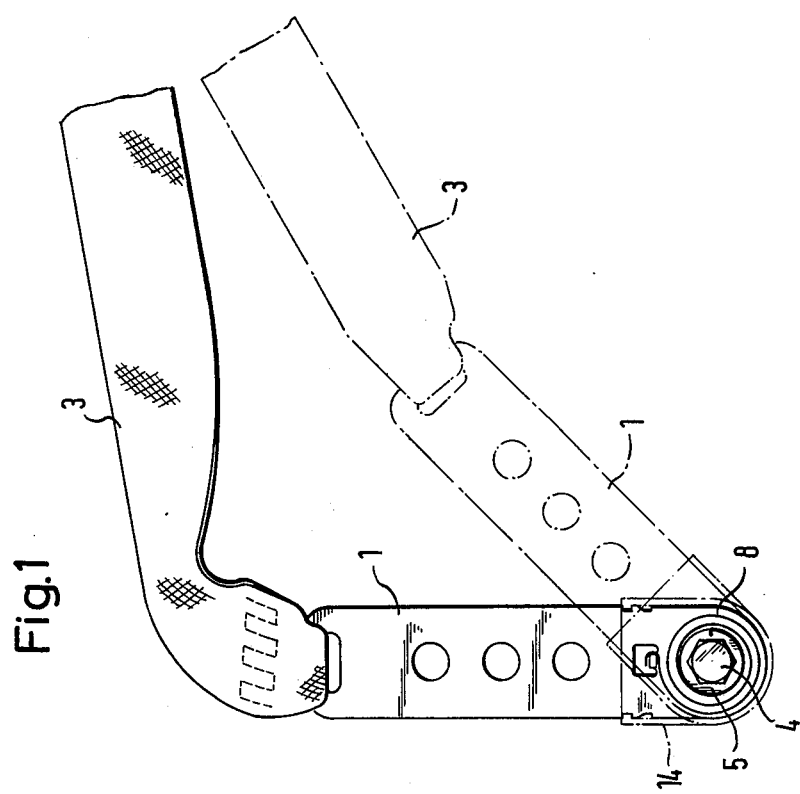
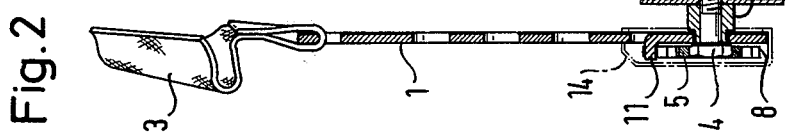

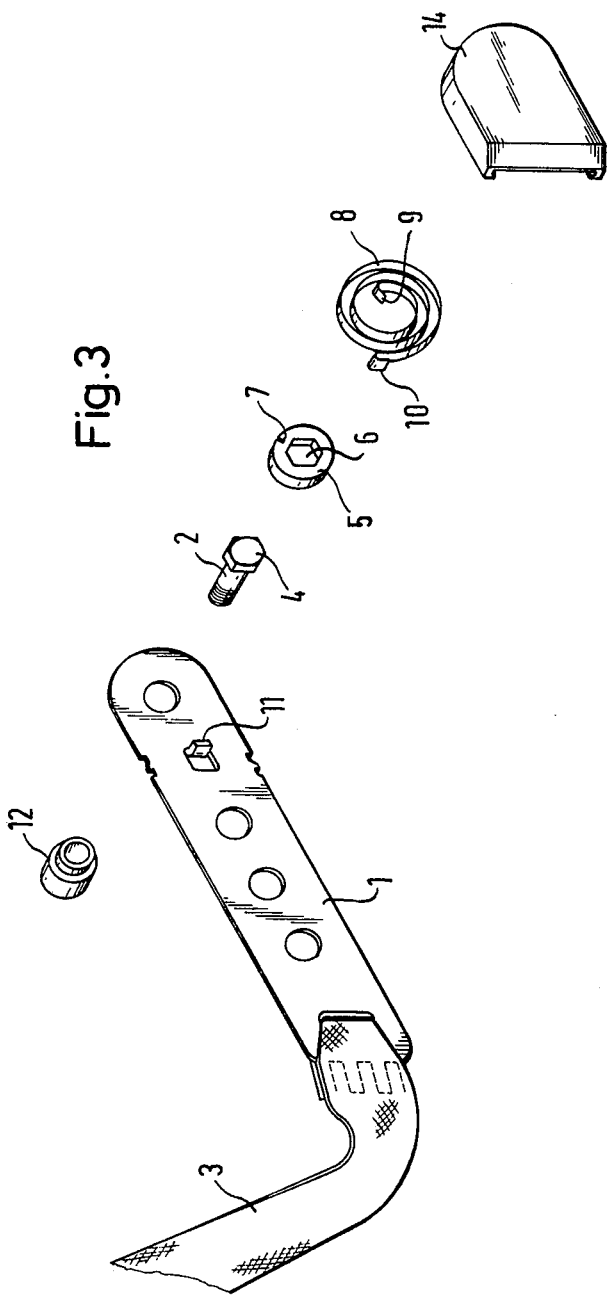

SWINGING FITTING FOR SAFETY BELTS IN MOTOR VEHICLES

BACKGROUND OF THE INVENTION

1. Field of the Invention

This invention relates to a swinging fitting for safety belts in motor vehicles and more particularly, refers to a new and improved swinging fitting having a belt holder which can rotate about a bearing pin and is held in its rest position by a tilting spring when the belt is not in use.

2. Description of the Prior Art

Swinging fittings are advantageous in some vehicle types in order to swing the attachment point of the safety belt out of the entering zone when the belt is put down.

The known swinging fittings are designed in the form of one-arm levers, in which a tilting or return spring which engages the swinging fitting at one spring end and is coupled to the bearing pin at its other spring end, is arranged in the vicinity of the pivot bearing.

In the known embodiments, the coupling of the tilting spring to the stationary bearing pin presents difficulties, which can be overcome only at increased cost. Thus, in one known design, the inner turn of a spiral tilting spring is designed in the form of a hexagon, which corresponds to the screw head of the bearing post but can only be produced at additional expense.

SUMMARY OF THE INVENTION

It is an object of the invention to provide a swing fitting for safety belts in motor vehicles in which there is simplification of the coupling between the tilting spring and the bearing post.

With the foregoing and other objects in view, there is provided in accordance with the invention a swinging fitting for safety belts in motor vehicles having a belt holder arm rotatable about a bearing pin and a tilting spring urging the return of the belt holder arm when tilted to a rest position and holding the belt holder arm in rest position when the belt is not in use, including an intermediate member in locking engagement with the bearing pin with one end of the tilting spring engaged by the intermediate member and the other end of the tilting spring engaged by the holder arm.

Other features which are considered as characteristic for the invention are set forth in the appended claims.

Although the invention is illustrated and described herein as embodied in a swinging fitting for safety belts in motor vehicles, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 shows a side view of the swinging fitting designed in accordance with the invention, with the rest position shown in solid lines and the use position shown in broken lines; and FIG. 2 is a side view in cross section of the swinging fitting of FIG. 1; and FIG. 3 is an exploded view of the swinging fitting shown in FIGS. 1 and 2.

DETAILED DESCRIPTION OF THE INVENTION

The tilting or return spring is coupled to an intermediate member which is connected in a form-locking manner to the bearing post.

In one preferred embodiment, this intermediate member is in the form of a washer and has, if the bearing pin is designed as a polygonal-head screw, a corresponding key opening. In another form the bearing pin is provided with a screw head having a recess in the shape of an internal-polygon and the intermediate member has an ear or projection which is inserted into the internal polygon in locking engagement with the bearing pin.

The tilting spring is spirally bent and encloses the so designed intermediate member and the inner end of the spring engages the outer rim of the intermediate member. The intermediate member which can be made of metal is preferably made of plastic as a molded or pressed or diecast part.

The tilting spring and the intermediate member are physically secured by a cover cap, so that no additional fastening means are required.

The design and arrangement of an intermediate member in accordance with the invention results in obtaining a simple, inexpensive and yet secure means of connecting the tilting spring to the bearing pin, which occupies relatively little space as compared to known arrangements.

The swinging fitting shown in FIGS. 1 to 3 of the drawings has a one-arm swinging lever which is pivoted on a bearing pin 2 designed as a hexagon-head screw, with the interposition of a shouldered bushing 12 in the body 13 of a motor vehicle. At its free end, the swinging lever 1 is connected to a safety belt 3. On the head 4 of the bearing pin 2, a washer-like intermediate member 5 is placed, which encloses the screw head 4 with a corresponding key aperture 6 in a form-locking manner. The intermediate member 5 has at its rim a radially oriented slot 7, into which the bent-off inner end 9 of a return spring 8 is engaged. The return spring 8 surrounds the intermediate member 6 in the form of a spiral. The outer end 10 of the pre-tensioned tilting spring 8 rests against an ear 11 of the swinging lever 1. The intermediate member 5 and the tilting spring 8 are secured in their position by a cover cap 14 sprung onto the swinging lever 1.

As seen in FIG. 1, the swinging lever 1 is held in its rest position shown in solid lines by the tilting spring 8. The use position of the swinging lever 1 is shown by dash-dotted lines.

There are claimed:

1. In a swinging fitting for safety belts in motor vehicles having a belt holder arm rotatable about a bearing pin and a tilting spring urging the return of the belt holder arm when tilted to a rest position and holding the belt holder arm in rest position when the belt is not in use, the improvement comprising
    a. an intermediate member between the bearing pin and the tilting spring with
    b. the intermediate member in locking engagement with the bearing pin and
    c. with one end of the tilting spring engaged by the intermediate member and
    d. the other end of the tilting spring engaged by the holder arm.

2. Swinging fitting according to claim 1, wherein the bearing pin is a screw with a polygon-head and the intermediate member has a key aperture corresponding to the screw head for locking engagement of the intermediate member with the bearing pin.

3. Swinging fitting according to claim 1, wherein the bearing pin is a screw with a screw head having an opening in the form of an internal polygon, into which opening fits in locking engagement a correspondingly shaped ear of polygon form on the intermediate member.

4. Swinging fitting according to claim 1, wherein the intermediate member is in the form of a washer and is surrounded by a spirally-bent tilting spring, and wherein the inner end of the tilting spring is engaged at the outer rim of the intermediate member.

5. Swinging fitting according to claim 1, wherein the intermediate member is a pressed part.

6. Swinging fitting according to claim 1, wherein the intermediate member is a diecast part.

7. Swinging fitting according to claim 1, wherein the tilting spring and the intermediate member are secured in place by a cover cap.

* * * * *